United States Patent
Lechen

(10) Patent No.: US 6,647,637 B2
(45) Date of Patent: Nov. 18, 2003

(54) USE OF MAGNETO-RESISTIVE SENSORS FOR BOREHOLE LOGGING

(75) Inventor: Helmut Lechen, Bremen (DE)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/057,650

(22) Filed: Oct. 29, 2001

(65) Prior Publication Data

US 2002/0162240 A1 Nov. 7, 2002

Related U.S. Application Data

(63) Continuation-in-part of application No. 09/703,766, filed on Nov. 1, 2000, now Pat. No. 6,560,889.

(51) Int. Cl.[7] .............................. G01B 5/08; G01B 5/20
(52) U.S. Cl. ...................... 33/544; 33/544.3; 33/542.1; 33/558.2; 33/558.04; 33/783
(58) Field of Search ................. 33/542, 542.1, 33/543, 544, 544.2, 544.3, 555.1, 555.2, 558.01, 558.04, 558.2, 455, 783

(56) References Cited

U.S. PATENT DOCUMENTS

| | | | |
|---|---|---|---|
| 2,267,110 A | 12/1941 | Kinley et al. | 33/178 |
| 2,719,363 A | 10/1955 | Montgomery et al. | 175/321 |
| 3,533,166 A | 10/1970 | Pino, Jr. | 33/174 |
| 3,977,468 A | 8/1976 | Brewer et al. | 166/241.5 |
| 4,006,530 A | 2/1977 | Nicolas | 33/178 |
| 4,121,345 A | 10/1978 | Roesner | 33/178 |
| 4,205,266 A | 5/1980 | Lichtenberg | 324/207.17 |
| 4,226,024 A | 10/1980 | Westerberg et al. | 33/143 |
| 4,228,593 A | 10/1980 | Frank et al. | 33/178 |
| 4,251,921 A | 2/1981 | Fink | 33/302 |
| 4,530,161 A | 7/1985 | Blankinship | 33/178 |
| 4,546,314 A * | 10/1985 | Minerbo et al. | 324/221 |
| 4,559,709 A | 12/1985 | Beseme et al. | 33/178 |
| 4,673,890 A | 6/1987 | Copland et al. | 166/64 |
| 4,830,105 A | 5/1989 | Petermann | 166/241 |
| 4,852,262 A * | 8/1989 | Babcock et al. | 33/543.1 |
| 5,086,645 A | 2/1992 | Deaton | 73/151 |
| 5,092,056 A | 3/1992 | Deaton | 33/544 |
| 5,565,624 A | 10/1996 | Deboaisne et al. | 33/543 |
| 6,065,219 A | 5/2000 | Murphey et al. | 33/302 |

FOREIGN PATENT DOCUMENTS

| | | |
|---|---|---|
| DE | 3821764 A1 | 1/1990 |
| JP | 359142403 A | 8/1984 |

* cited by examiner

Primary Examiner—Diego Gutierrez
Assistant Examiner—Lydia M. De Jesús
(74) Attorney, Agent, or Firm—Madan, Mossman & Sriram, P.C.

(57) ABSTRACT

A downhole caliper instrument utilizing a linear or arcuate magneto resistive sensor to determine the position of one or more caliper arms which extend from a carrier tool to touch the surface of a borehole wall. A processor and firmware are included to calculate and plot the borehole radius. A plurality of magneto resistive sensors are provided to calculate the sine, cosine and tangent for accurate motion of each independent arm. The magneto resistive sensors sense the position a precise magnetic ruler linked to the caliper arm. The position of the caliper arm determines the radius of the borehole. Calculation of Radius/Diameter is preferably performed in the computer on surface. The downhole controller's firmware controls the multiplexer switching, A/D conversion and other functions.

16 Claims, 10 Drawing Sheets

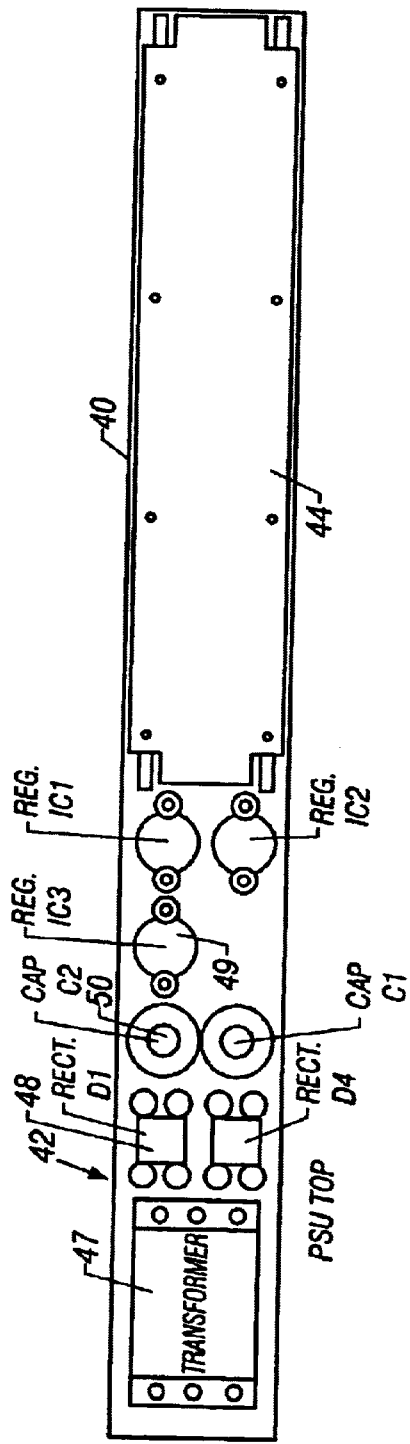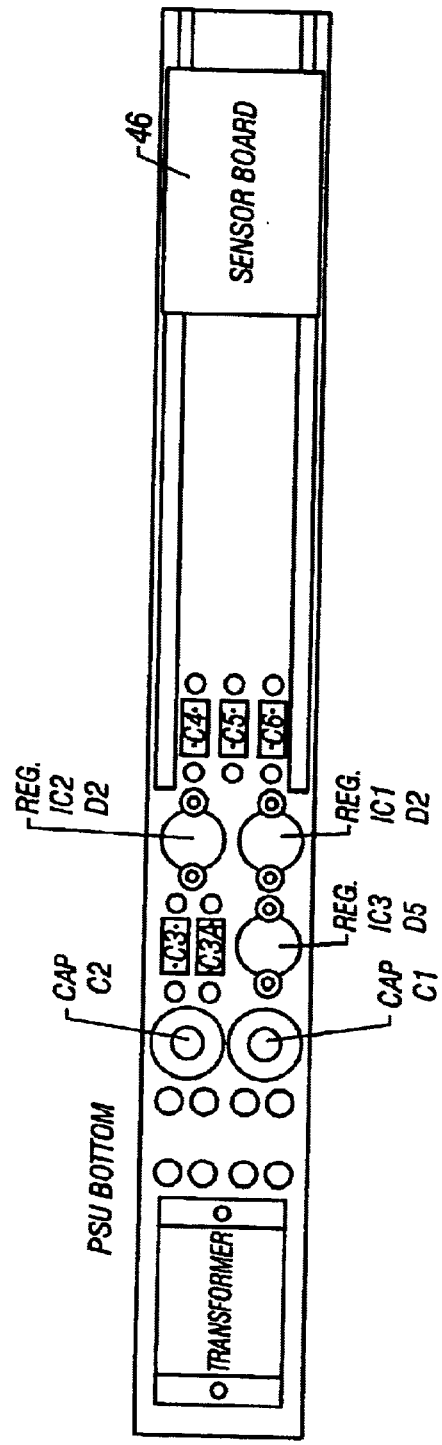
FIG. 5A
FIG. 5B

USE OF MAGNETO-RESISTIVE SENSORS FOR BOREHOLE LOGGING

CROSS REFERENCE TO RELATED APPLICATIONS

This application is a continuation in part of U.S. patent application Ser. No. 09/703,766 entitled "Use of Magneto-Resistive Sensors for Borehole Logging" filed on Nov. 1, 2000 now U.S. Pat. No. 6,560,889 by Helmut Lechen.

BACKGROUND OF THE INVENTION

1. Field of the Invention

The present invention relates to the use of magneto resistive sensors for calculating the diameter of a borehole.

2. Background of the Related Art

Down hole distance and bore hole radius measurements have previously been performed with instruments using potentiometers, linear voltage transformer (LVT) sensors or linear voltage differential transformer (LVDT) sensors. Potentiometers are resistors with an attached position indicating slider. The slider contacts the resistor at any point between the potentiometer ends. The mechanical position of the slider determines the resistance between the slide and the ends of the potentiometer. A position measurement is thereby possible, by measuring either the resistance or the voltage between the slider and one of the potentiometer ends.

In down hole logging instruments, potentiometers are typically placed inside of an oil-filled container, so that the mechanical movement of the slider is not influenced by the bore hole pressure. The oil-filled containers are usually connected to a main pressure housing via a pressure feed through connector and pressure resistant wires. Typically, there is hysteresis between the values measured moving in one direction as opposed to values measured while moving in the other direction. New potentiometer devices exhibit small hysteresis effects but as the devices age, the hysteresis effects becomes more severe as potentiometers begin to wear. Typically, the achievable resolution depends upon the design of the potentiometer. If a wire-wound potentiometer is used (which is usually the case), the resistance between two windings determines the resolution of the wire wound potentiometer.

LVT/LVDT sensors are also popularly used to measure distances downhole. The operating principle behind LVT and LVDT sensors is based on a transformer having a movable ferromagnetic core. The physical position of the core inside of the surrounding windings alters the coupling between the primary and secondary coils of the transformer. While keeping the primary supply voltage constant, the secondary voltage changes in proportion to the position of the positional ferromagnetic core. The LVT sensor uses a single primary coil and one secondary coil. One side of the primary and secondary coils are connected, so that only three wires are necessary to connect an LVT device. The more accurate LVDT device uses two secondary coils. In the LVDT the difference between the two secondary coil voltages is divided by the sum of the two secondary coil voltages, thereby compensating for voltage changes due to unstable supply voltages.

Unlike potentiometer position sensors, LVT and LVDT sensors do not exhibit hysteresis or wear. LVT/LVDT sensors also experience less resolution limitations. Thus, LVT/LVDT sensors are an improvement over potentiometer sensors. The LVT/LVDT measurement, however, is an AC-measurement, thus, the LVT/LVDT sensor signal has to be rectified by some means (hardware, software) for measurement. If larger distances are to be sensed, LVT/LVDT sensors become very large and very expensive. High pressure/temperature versions are possible but they are bulky and expensive. Thus, there is a need for a downhole position indication device that is accurate, durable, compact and not sensitive to down temperature and pressure.

SUMMARY OF THE INVENTION

The present invention provides a magneto restrictive position indication device for measuring the radius of a borehole. The present invention does not require any exposed wiring when used in down hole logging equipment. The present invention is more reliable than known measurement systems because of the absence of hysteresis and because the present invention is less sensitive to downhole pressure and temperature than known prior systems. The present invention is also easier to maintain. Additionally, the present invention's measurement accuracy is limited only by the mechanical and electronic components comprising the structure, rather than by the sensor system itself. A measurement accuracy of 50 μm (0.002 inch) is easily achievable with the present invention. The resolution of the present invention typically is 0.002 inch. The sensor of the present invention also requires less space than all other known measurement systems.

The distance measured by the preferred embodiment is preferably 5 mm (just less that ¼ inch). By combining two of these measurements, distances of up to about 1.5 inches can be reliably measured. Combining three measurements enables distances of up to 10 inches to be measured with the same accuracy and reliability over the full pressure and temperature range downhole.

The structure of the present invention provides a unique signal amplitude between 0° and 180°. In order to obtain unique information over the full 360° range, a second sensor (bridge) is provided, which is mechanically shifted or displaced by exactly one quarter of the inter pole distance, that is, the second sensor is shifted by 90°. The output signal of the second sensor also resembles a sine wave, having an amplitude waveform shifted by 90° compared to the signal from the first sensor, the cosine. The phase relationship between the outputs of the first sensor and the second sensor in both embodiments is depicted in FIG. 4.

Preferably, linear magnetic rulers with precisely defined inter pole distances of 0.125 inch to 0.25 inch are provided in order to use the preferred sensors which precisely measure magnetic pole position. Magnetic poles are precisely magnetized or "written" on the surface of a magnetic material. Accurately positioned magnetizing devices, which are well known in the art, are used for the production of such precise linear magnets or so-called "magnetic rulers."

The tangent or ratio of the sine and cosine generated by the first and second sensors are calculated from these two sensor signals. Considering the magnetic pole quadrants for the tangent, this arrangement enables the present invention to determine the exact sensed position of a magnetic ruler over the entire range from 0° to 360°. The resolution and accuracy of the structure of the present invention depends upon the comprising auxiliary hardware, including the resolution of the analog to digital (A/D) converter. Calculating the tangent relationship provides the additional advantage of automatic compensation for temperature drifts and distance changes encountered by magnet/sensor assembly of the present invention.

In a preferred embodiment, the arms of the preferred caliper instrument move a sliding or rotating linkage connected to a magnetic ruler and pivoting end of each caliper arm. The caliper arm movement and associated magnetic ruler are sensed by a magneto resistive sensor, which is contained in a pressure tight housing of the instrument. The present invention provides a pressure tight sensor housing using an O-ring sealed connection to the central housing (which for simplicity is not shown on the drawing). Thus, the measurement instrument does not require any electrical connections exposed to the bore hole fluid.

While one sensor can accurately measure the distance between two magnetic poles, two or three measurements are combined for determining the absolute position of the magnetic ruler over large position ranges (5" or more). In a preferred embodiment, the magnetic ruler is in form of a disk or half disk. The magneto resistive sensors determine the angular rotation of the turning disc shaped magnetic ruler as the outer end of the caliper arm turns. The circular magnetic ruler is attached to the pivoting end of the pivotally attached caliper arm to determine the radius of the borehole. The borehole diameter and slope are calculated from the radius measurements.

BRIEF DESCRIPTION OF THE DRAWINGS

FIGS. 5a and 5b are schematic illustrations of the electronics of a preferred embodiment of the present invention;

DETAILED DESCRIPTION OF A PREFERRED EMBODIMENT

Figure 1:
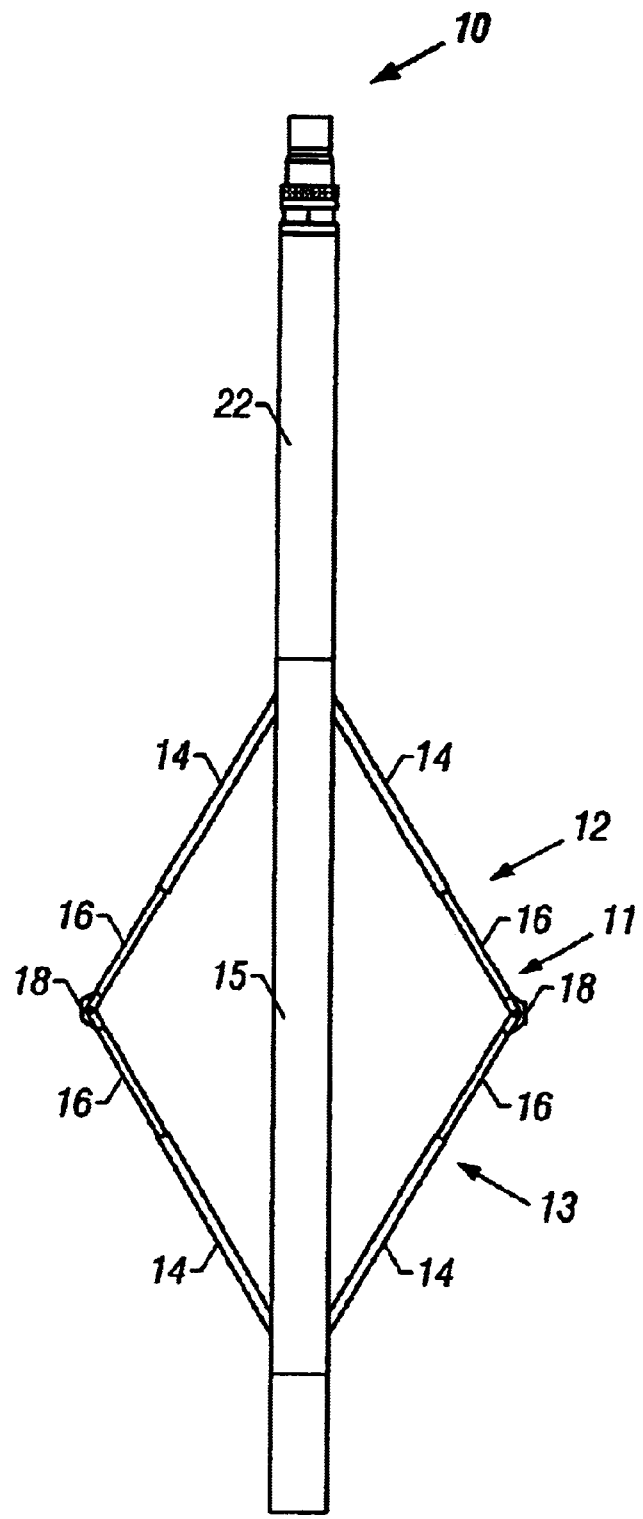
FIG. 1 is a side view of a preferred embodiment of the present invention.
Figure 6:
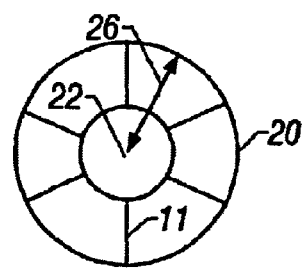
FIG. 6 is a top view of a preferred embodiment deployed in a borehole.

Turning now to FIG. 1, the present invention provides a six-arm caliper instrument comprising six radial extensive, equally spaced caliper arms, each of which independently enables an independent radius measurement of the borehole in which the caliper instrument is deployed. The six-arm caliper instrument 10 provides six independent arms 11, each of which comprises two spring-loaded telescopically extensible sections 14 and 16, as illustrated in FIG. 1. The caliper instrument of the present invention enables logging of independent borehole radius measurements associated with each six caliper arms, while the caliper instrument traverses the bore hole 22. The tool may alternately have 1–6 or more caliper arms. Borehole radius measurements are taken and logged during ingress and egress of the caliper instrument in the borehole, and while the caliper instrument is descending or ascending the borehole. The preferred caliper arm 11 comprises two spring-loaded telescopic sections 14 and 16, which enable the caliper arm sections to extend or compress to conform to the diameter of the borehole. A pad 18 is attached between the upper and lower telescopic arm sections 14 and 16 of each caliper arm 11. The pad 18 engages the borehole wall 20 to measure caliper arm deflection angles to calculate the radius of the bore hole, as shown in FIG. 6. The caliper arms 11 change length and the angle of attachment to the instrument body of upper arm section 12 and lower arm section 13, as the instrument 10 traverses the bore hole 20 and the radius 26 of the bore hole 20 changes.

Figure 2:
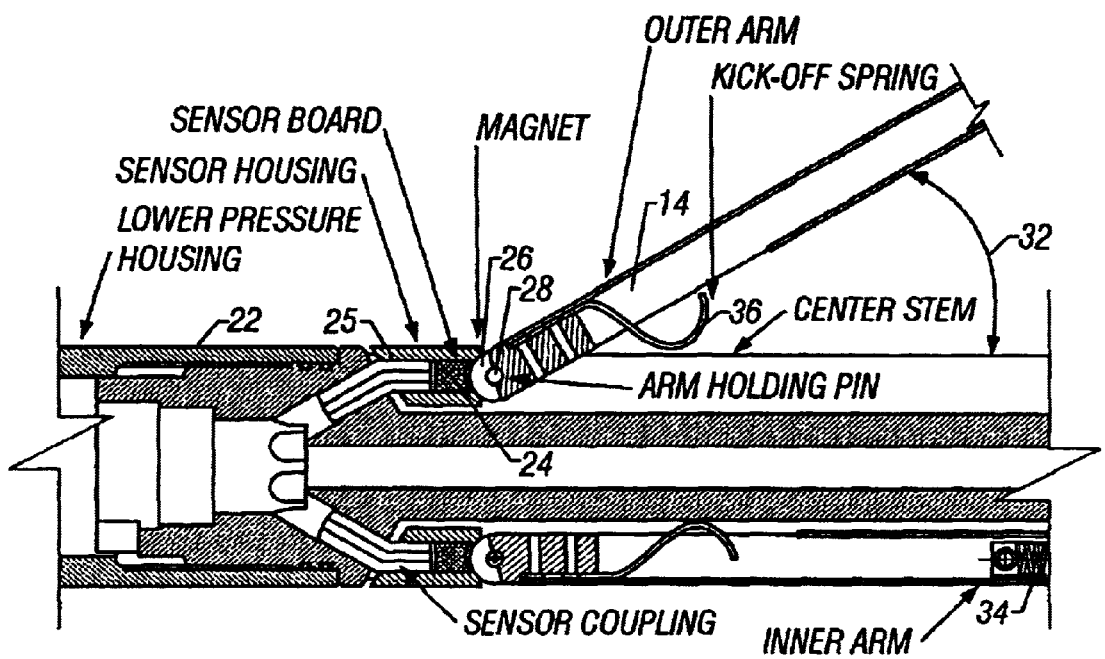
FIG. 2 is a cross section of a preferred embodiment of the present invention.

Turning now to FIG. 2, in order to measure the movement of arm 11 upper section 12 and lower section 13, magneto resistive angle sensors are placed at the pivotally attached ends of upper caliper arm section 12 and lower caliper arm section 13. FIG. 2 illustrates a cross section of the preferred angle sensing mechanism of the present invention. The angle change of each telescopic arm section is sensed by magneto resistive angle sensor 24. Sensor 24 is located at the end of the arm section where each arm section is pivotally attached via pin 28 to instrument body 22. The pivotally attached caliper arm end contains a small half-ring magnetic ruler 26, which is precisely marked with magnetic poles and calibrated for precise measurement of the angle 32 between the arm section 14 and instrument body 22.

The magnetic sensor 24 is contained in a pressure housing 22, which forms the body of the instrument. A sensor housing 25, which contains the sensor 24, is coupled to the mandrel via an O-ring sealed mechanical coupling. Each caliper arm 11 comprises two telescopic sections. Each telescopic section comprises an inner section 16 and an outer section 14. The inner arm section is smaller in diameter enabling the inner arm section to telescopically slide into the larger outer arm section. A spring 34 inside of the larger telescopic arm section engages and urges the smaller inner telescopic arm section outward to its outmost position. A kick off spring 36 urges the telescopic arm section to swing out from the instrument body 22. Both the telescopic arm spring 34 and the kick off spring 36 are limited in expansion by the pad 18 of the caliper arm 11 contacting the surface of the bore hole wall 20, thereby defining the radius of the bore hole.

In the preferred embodiment of FIG. 2, the sensors are able to measure one pole-distance of the half-ring magnet. The magnets are magnetized for 10 poles on the circumference, i.e. one pole distance is equivalent to 36°. The resolution for the measurement is determined by the resolution of the A/D converter, the quality of the electronics and the instrument firmware. In the case of the preferred embodiment, the resolution is set to 0.036° by the firmware.

Figure 3:
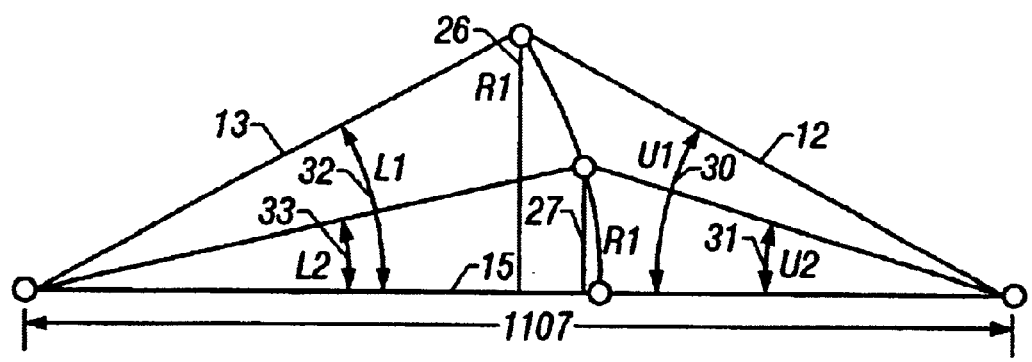
FIG. 3 is an illustration of the measurement geometry of the present invention.

Turning now to FIG. 3, the radius 26 of the bore hole 20 is determined by the triangle formed by the two pivoting telescopic caliper arm sections 12 and 13 and the constant base length 15 formed by the distance between each arm section hinge 28, which attaches the pivoting arm sections to the instrument body 22. The angles 30 and 32, between the base and each of the arms, is measured, as shown in FIG. 3. These angle measurements fully determine the triangle formed by the caliper arm sections and the instrument body. Thus, the height of the triangle, which is equivalent to the radius 26 of the borehole can be calculated. In a preferred embodiment, the radius measuring range is $1^{13}/_{16}$ inch to 13 inches.

The instrument provides user selectable data sets that enable the user to select which of the available data to send to the surface. The user can also select a test data pattern to send to the surface for testing communications. In an alternative embodiment, the data is stored in the tool downhole in memory on board the electronics board for later retrieval. Auxiliary signals comprising supply voltage and instrument housing temperature are also sent to the surface or alternatively stored in the tool. A preferred data set provides radii calculated in the instrument and enables quick-look tests wherein radii are determined by reference to a look up table indexed by the caliper arm angle measurements.

The spring-loaded telescopic caliper arm sections enable the upper arm to collapse and reduce in length as the instrument descends into the borehole. Similarly, while logging during ascension of the instrument, the lower caliper arm section collapses as necessary. The independent telescopic nature of the caliper arms enables each arm to be closed and fully retracted, even if one of the other arms is stuck in its most extended position.

As shown in FIG. 3, angles 30 and 32 between the telescopic upper 12 and lower 13 caliper arm sections and the instrument body 22 are sensed by magneto resistive sensors. From these two angles and the known distance 15 between the respective arm section hinges, the radius 26 can be calculated for each arm. FIG. 3 shows two possible arm positions with two different radii 26 and 27, two different sets of lower arm section angles 30 and 31 and upper arm section angles 32 and 33.

The relationship between the measured angles 30 and 32 of each telescopic arm section and the radius R 26 is given by the geometry of the instrument as shown in FIG. 3. In a preferred embodiment, the fully closed instrument has a diameter of 3.625" or 92.075 mm, which is equivalent to a radius R of 1.8125"or 46.0375 mm. Using the actual instrument dimensions, the relation between the radius of the bore hole, R and the measured angles 30 and 32 is as follows:

$$R(mm) = 46.0375 + \frac{tg(\text{Lower}) \cdot tg(\text{Upper})}{tg(\text{Lower}) + tg(\text{Upper})} * 1107$$

All dimensions for this equation are in mm. The conversion to inches is achieved by dividing the result by 25.40. The preferred firmware provided in the instrument of the present invention enables an accurate angle measurement and calculation of radius or diameter. During radius logging, in a preferred embodiment, a surface computer system is used to calculate the radii from these accurately measured angles, using the above equation.

Two sensors are used per caliper arm, one to sense the angle of the telescopic upper arm section, and the other one to sense the angle of the lower telescopic arm section. In a preferred embodiment, the resolution of the measurement system is 0.036°, which is provided in 1000 increments for an angle measurement range of 0 to 36°. At the largest radius measured (13 inches), the resolution of 0.036° provide a radius resolution of 0.44 mm (0.017 inch). Near the closed position (1 13/16 inch) a radius resolution of 0.35 mm (0.014 inch) is provided.

The springs 34 in the telescopic caliper arm sections do not provide a significant opening force when the arms are fully inside the mandrel. Therefore, leaf kick out springs 36 mounted at the ends of the arms are provided to help force the arms from the body for the first few inches.

In the preferred data acquisition mode, the caliper instrument of the present invention reads all caliper telescopic arm section sensors, calculates the various distances and places this data in a buffer. The sensor data is then transmitted to the surface, stored or processed immediately down hole in the instrument. As soon as a request for data is received, the collected data is sent and a new data collection cycle initiated.

In a preferred embodiment, the following data sets can be requested by the user:

Data Set 1)
  Six Radii, Temperature, Voltage
Data Set 2)
  Main logging data set. For each arm the upper and the lower angle are transmitted. Additionally, Temperature, Voltage, A/D offset are sent.
Data Set 3)
  Maintenance data set. For each sensor, the A/D reading is given. There are 24 sensors in the instrument, 2 per arm-half.
Data Set 4)
  Communication test pattern.

The caliper instrument of the present invention provides precise, high resolution information regarding the radial position of the caliper arms and proximity of the tool string to the bore hole wall. This information determines the distance from the tool string to the borehole wall. The borehole radius also infers the proximity of adjacent formations to the other logging instruments deployed in the borehole in the same tool string with the caliper instrument of the present invention. For example, a nuclear magnetic resonance (NMR) tool design to deploy near or against the borehole wall may require correction for measurements taken when the NMR tool is not adjacent or touching the bore hole wall. The caliper instrument can be combined with such an NMR tool or any other down hole instrument to measure the distance of the tool string to the bore hole wall. Thus, the present invention can be deployed on the same tool string with a formation proximity sensitive instrument to determine proximity and accommodate proximity corrections for such a tool.

Tool string orientation (north, south, east, west) is also sensed by the present invention along with the orientation of the NMR tool and other associated downhole tools, to facilitate proximity correction of direction sensitive instruments and measurements. The caliper instrument of the present invention does not centralize the downhole tool string. The present invention only senses the radial position of the tool string in the borehole by obtaining the radii measurements on the six caliper arms. Using the information provided by the caliper arms along with orientation data, the present invention enables accurate bore hole corrections to be applied for the formation proximity and orientation sensitive instruments deployed on the tool string.

The actual position of the sensing arm can move above or below a center position, so that the measuring point may be shifted during logging. The amount of movement is preferably less than ±1.75 inch and can actually be calculated from the data sent by the instrument, so that precise radius curve depth corrections are possible.

Figure 12:
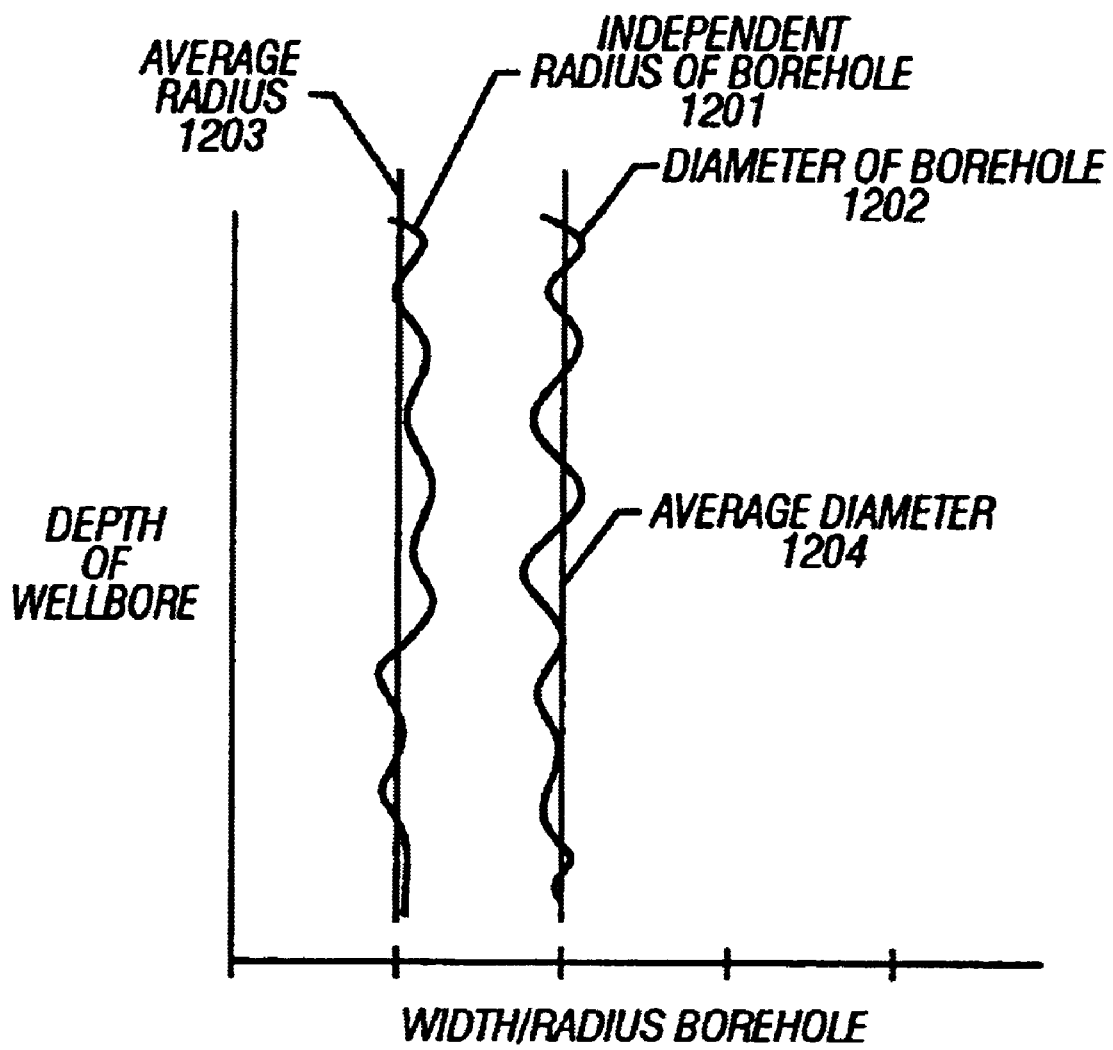
FIG. 12 is an illustration of a plot of the independent radii and diameter of the borehole provided by the present invention.

As shown in FIG. 12, the present invention enables well bore radii 1201 or diameter 1202 plotting as well as an average bore hole diameter 1204 calculation. Measurement errors are minimized by placing caliper calibration rings on the instrument and performing a two-point calibration. The present invention is preferably calibrated as follows. The preferred caliper instrument is connected to a cable head via a common remote instrument. A small diameter calibration ring, e.g., 8-inch is applied to the caliper arms and an angle reading a recorded. A small diameter calibration ring, e.g., 12-inch is the applied to the caliper arms and another reading is recorded. The rings simulate borehole radius measurements. The calibration readings are used to adjust for angle measurements and radius or diameter calculations made during actual operations in the bore hole. Typically, the caliper instruments are calibrated on site and then verified inside the surface casing. For verification before logging, the tool is stopped inside casing, before lowering the instrument into an open hole. A verification routine (before log verification) is performed and a reading recorded. To verify the instrument after logging, after retrieving the caliper instrument back into the casing, the operator stops the cable hoist and selects a verification routine, records a reading and enters it for a second verification point.

In a preferred embodiment, to begin operations, the preferred caliper instrument is connected to a cable head via a common remote interface. The instrument is powered by connecting the instrument to a 180 VDC power source. The instrument is then calibrated per the calibration instructions as shown above. The power is then removed and the caliper instrument connected anywhere within the downhole tool string. After calibration, the instrument is now ready for bore hole radius logging.

Turning now to FIG. 5, the electronics 40 of the preferred instrument are contained in the upper pressure housing, as shown in FIG. 5. The electronics comprise a power supply 42, a CPU board 44 and a caliper board 46. The power supply consists of a transformer 47, rectifier 48, three voltage regulators 49 and capacitors 50. The power supply provides preferred power for the caliper boards and the preferred CPU board. This CPU board contains an instrument bus interface, memory and a serial I/O port. The preferred caliper instrument utilizes this I/O port. The signal-out lines are used to control the caliper boards and the signal-in lines are used to read the information from the caliper sensors. Together with a ground wire, 5 wires are used between the CPU board and the caliper board. Any suitable CPU board such as an INTEL PENTIUMTM processor may be substituted for the preferred CPU board. The caliper board contains multiplexers, sample and hold circuits, shift registers, analog to digital converters and tri-state buffers for data acquisition and transmission.

Preferably, an 8-bit shift register is used to control the functions of the caliper board. One control sequence consists of 8 bits. After the CPU board sends the respective data sequence to this register, the caliper board executes the 8-bit command.

The 16-bit A/D converter converts the following signals in the following sequence:

Signal Sine of Lower Sensor of Arm 1;

Signal Sine of Upper Sensor of Arm 1;

Signal Cosine of Lower Sensor of Arm1;

Signal Cosine of Upper Sensor of Arm 1;

The same sequences are repeated for Arms 2 to 6; and

The seventh sequence collects auxiliary data (voltages, offset, temperature).

Signals are first selected, then the sample and hold circuits are switched to hold and all signals for one caliper arm pair (lower and upper sections) are then sequentially converted. The sample and hold outputs are switched to a multiplexer for output. The output of the multiplexer is connected to the A/D converter via an operational amplifier.

The A/D converter outputs are clocked into the signal input line of the CPU board. At the end of one complete cycle, 24 sensor signals (12 sine and 12 cosine) are available on the CPU board. The sensor outputs are temperature-sensitive. For that reason, and for greater precision, the ratio of the sine and the cosine signals is calculated (tangent) and used for further calculations. Most of the temperature and other error producing influences cancel out in the tangent calculations.

Figure 4:
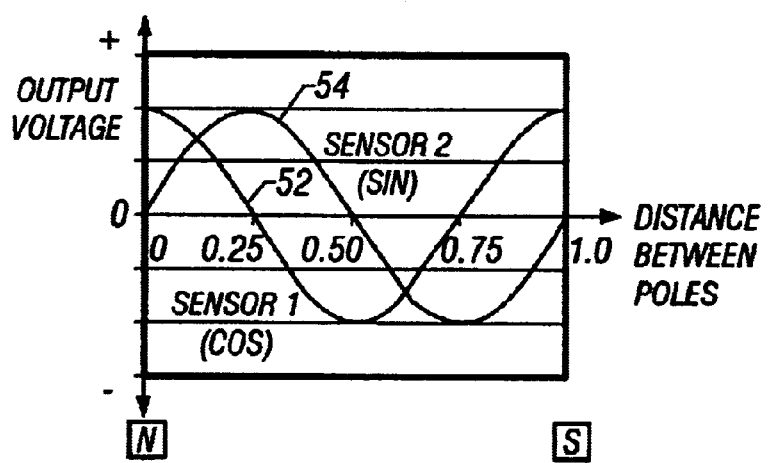
FIG. 4 is an illustration of the phase relationship of the sensors of the present invention.

The direction of the magnetic field of a circular magnet, where the poles are side by side, with alternating polarity, changes from between 0 to 180 degrees between two poles. The magnetic field is perpendicular to the surface plane of the magnet at the poles and parallel to the surface plane of the magnet in the middle between the two poles. The magneto resistive sensors of the present invention are only sensitive to alignment with the magnetic field, and not sensitive to the absolute direction of the magnetic field. Hence, the resistance of the first half bridge sensor reaches its minimum directly over one of the poles. The maximum sensor resistance is reached when the magnetic field is perpendicular to the sensor axis, that is, in the middle between the two poles 52 (cosine). The second half bridge sensor is mechanically rotated by 90°, having its output shifted by 90° compared to the first one 54 (sine). FIG. 4 illustrates the output voltages of the first sensor 52 and the second sensor 54, as the pair is moved across the distance.

The output voltage of a single sensor (half bridge) does not uniquely determine the position of the sensor between the two magnetic poles, as there are two positions possible for every value of the curve, except for the highest and lowest voltages. Also, if only one sensor were used to determine the position, the output voltage would have to be very stable. If the ratio of the two sensor voltages is taken (tangent), then the position can be exactly determined and the influences of sensitivity changes due to changing temperatures and distance changes between sensor and magnet cancel out in the tangent calculation. For the determination of the angle it is, of course, necessary to consider the quadrants.

External magnetic fields are added to the magnetic field of the magnet. This means, the magnetic field adds at one place and subtracts at another place, where the field of the magnet is oppositely directed. This would lead to incorrect calculations of the position, as the sine and cosine output are affected in the same direction. In order to compensate for this effect, a second series of sensors is placed exactly one pole distance apart from the first. From FIG. 4 above, it can be seen that the output signal of the sensor is the same above the North and the South pole. The external field, however would add to one and subtract from the other. In other words, a second sensor set, one pole distance apart from the first, provides the same position information as the first, the influence of the external magnetic field, however, is in the opposite direction. The signals of the two sensor sets added, and the total number of signals is not increased. This compensation works, as long as the external field experienced by the two sensor sets is substantially the same.

The maximum magnetic induction of the ruler magnets is about 0.1 T (1000 G). Values substantially below this value do not influence the measurement. Magneto-resistive sensors are preferably used for angle measurements because they are insensitive to the harsh down hole environment and can be mounted in non-magnetic pressure housings. High precision accuracy is achieved with these sensors and essentially limited only by the electronic components used to convert the voltages to digital signals.

Figure 7:
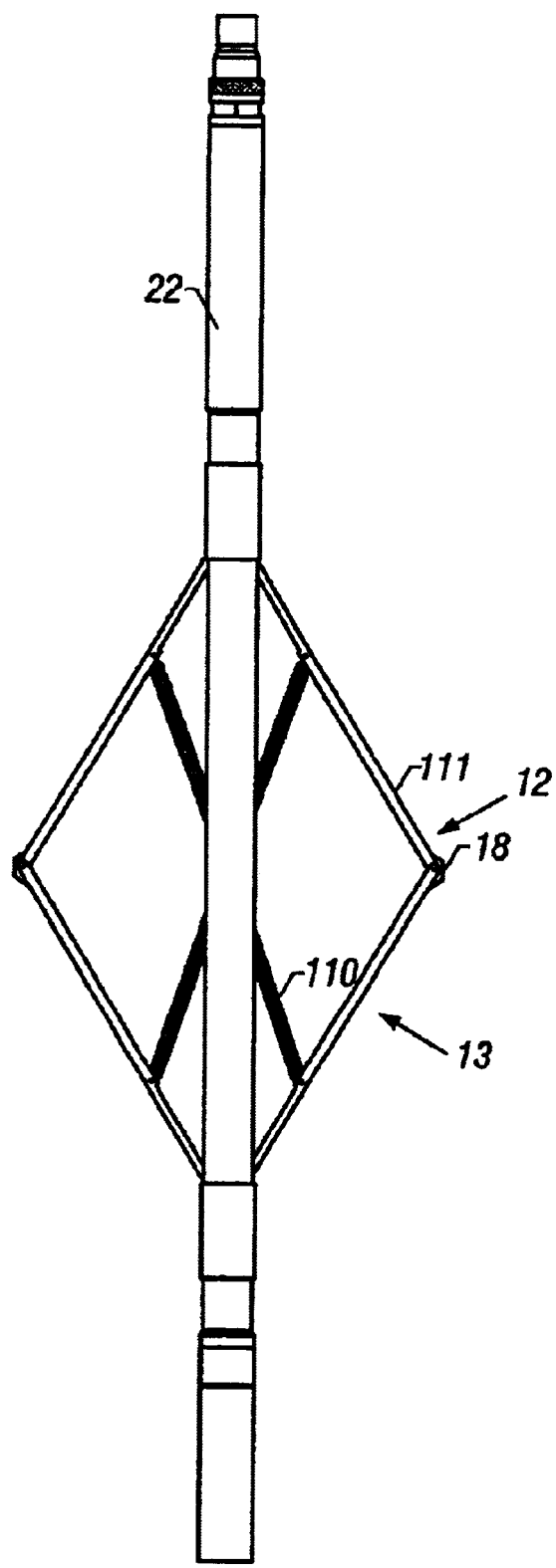
FIG. 7 is an illustration of an alternative embodiment of the present invention.
Figure 8:
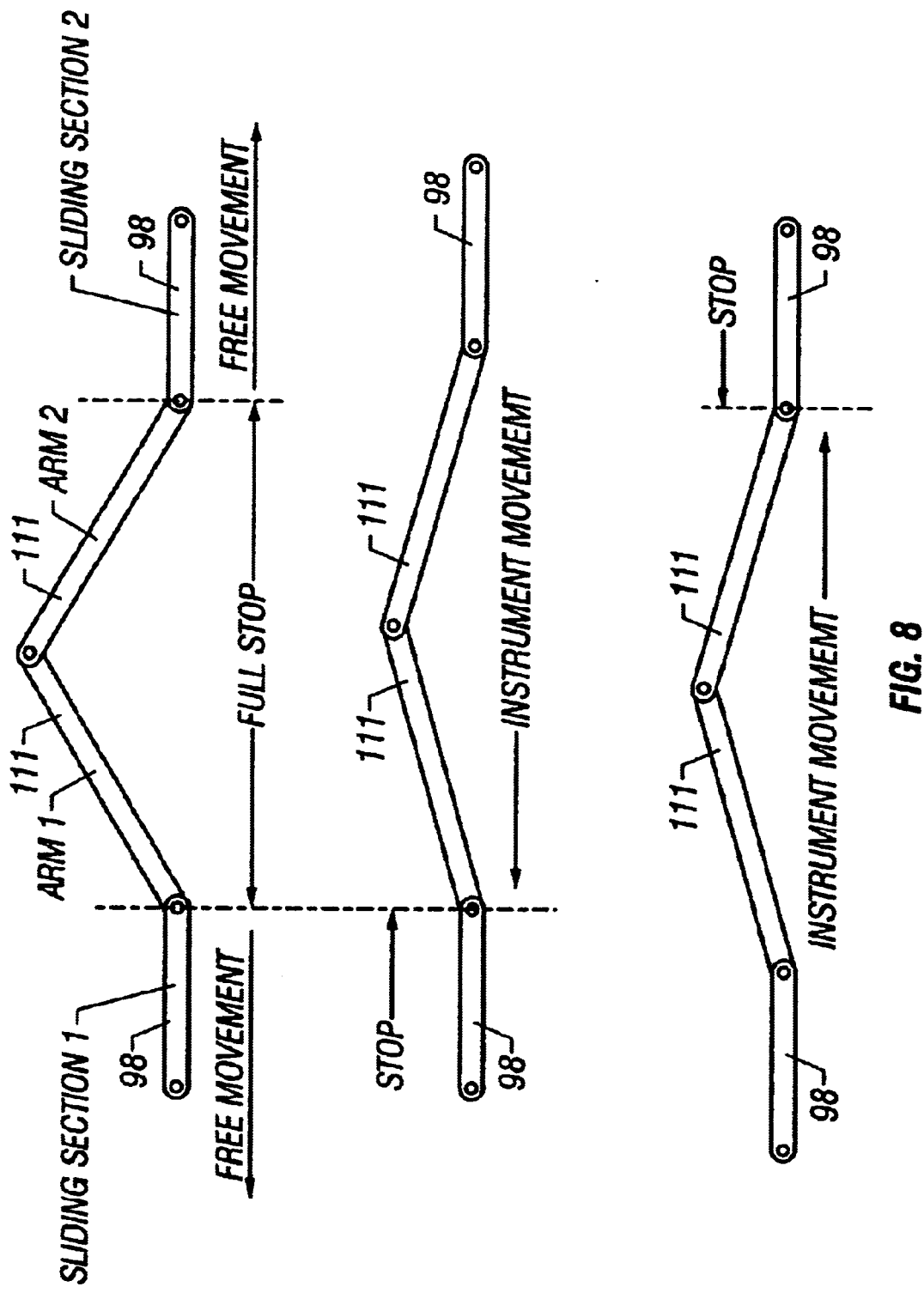
FIG. 8 is an illustration of the alternative caliper arm.

Turning now to FIG. 7, an alternative embodiment of the present invention is shown. The alternative embodiment uses rigid non-telescopic arms 111 that slidably attach to the tool body 22. For logging during downward progression in the borehole provides a full stop for the arms 111 on the lower side and free movement of the arms on the upper side. For logging upward in the borehole, the arm stop is on the upper side and the lower arms are freely movable. The preferred design provides two sliding sections which are hinged to the arms, as shown in FIG. 8. The movement of both, the upper sliding section and the lower sliding section is sensed and measured. From this measurement, the actual borehole radius and diameter are calculated. In this configuration, there is very small movement for an instrument in the almost closed postion, thus, the angular movement is additionally sensed. The two movements are mechanically added together and are measured using the same position sensor.

Figure 9:
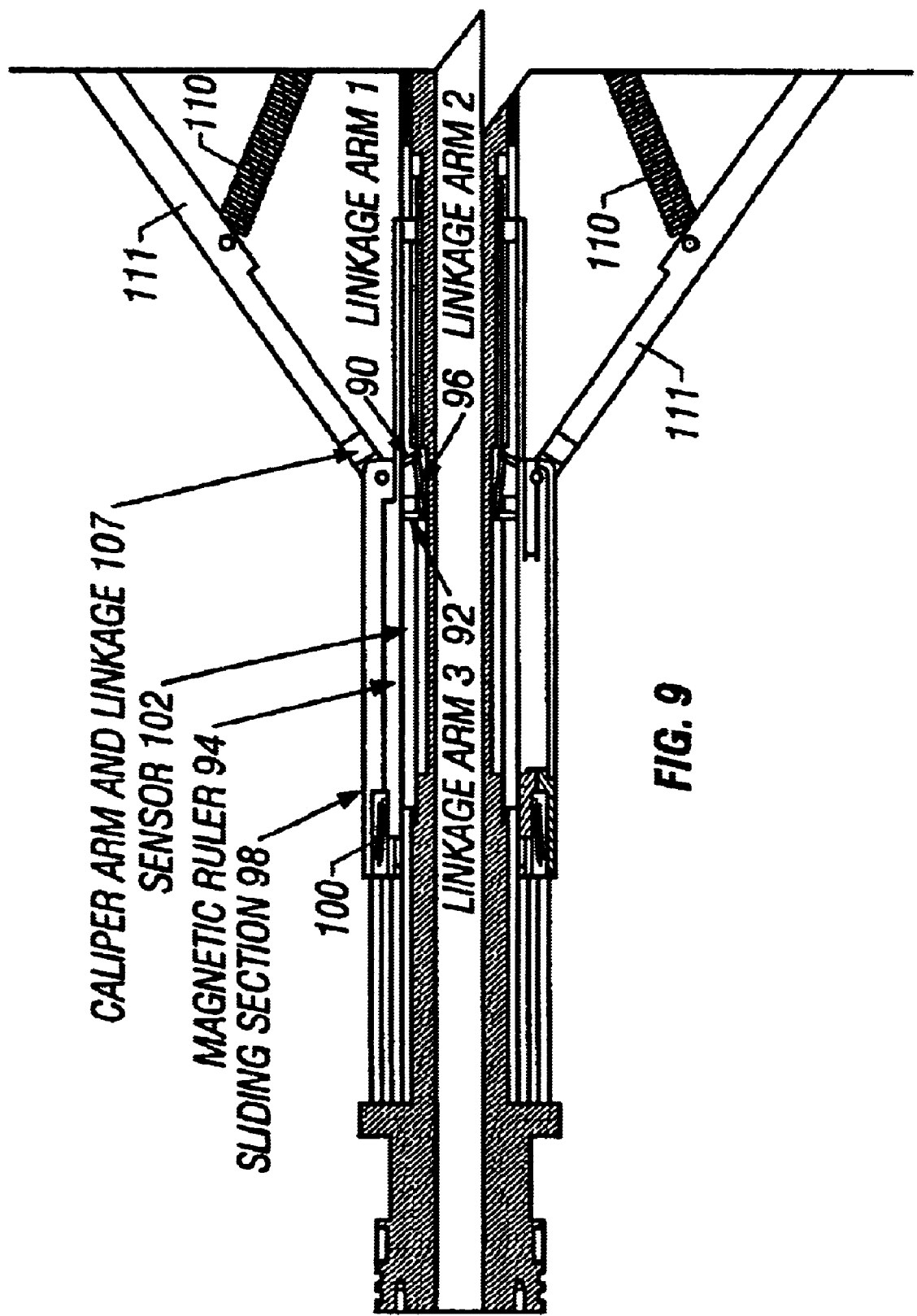
FIG. 9 is a more detailed drawing of the alternative caliper arm and linkage.

Referring now to FIG. 9, the angle change of the arm 111 is transferred into an axial movement by a small linkage. Linkage arm 90 is fixed to the caliper arm 111, linkage arm 92 is fixed to a magnetic ruler 94 and linkage arm 96 connects the two together. The magnetic ruler 94 slides inside the sliding section 98, this way moving together with the sliding section plus moving additionally if the caliper arm angle changes. A small spring holds the magnetic ruler under tension, so that mechanical play is substantially removed. The sliding section 98 movement is sensed by the sensor 102 which is located below the magnetic ruler 94.

The relation between the movement m and the borehole radius R is given by the geometry of the instrument—which is constant. For the calculations, the 'net radius' r is used. The value for r is 0 if the instrument is fully closed. The fully closed instrument has a diameter of 3.625" or 92.075 mm, which is equivalent to a radius R of 1.8125" or 46.0375 mm.

Using the actual instrument dimensions, the movement m can be calculated as follows:

$$r = R - \text{Instrument Body Radius}$$

and $$m = \frac{L2}{L1}r + L1 - \sqrt{L1^2 - r^2}$$

All dimensions can be in mm or inches. The conversion to inches from mm is achieved by dividing the numbers by 25.4. The length m is the average of the movements of the two sliding sections. Solving the same equation for r, the radius can be calculated from the movement.

Figure 10:
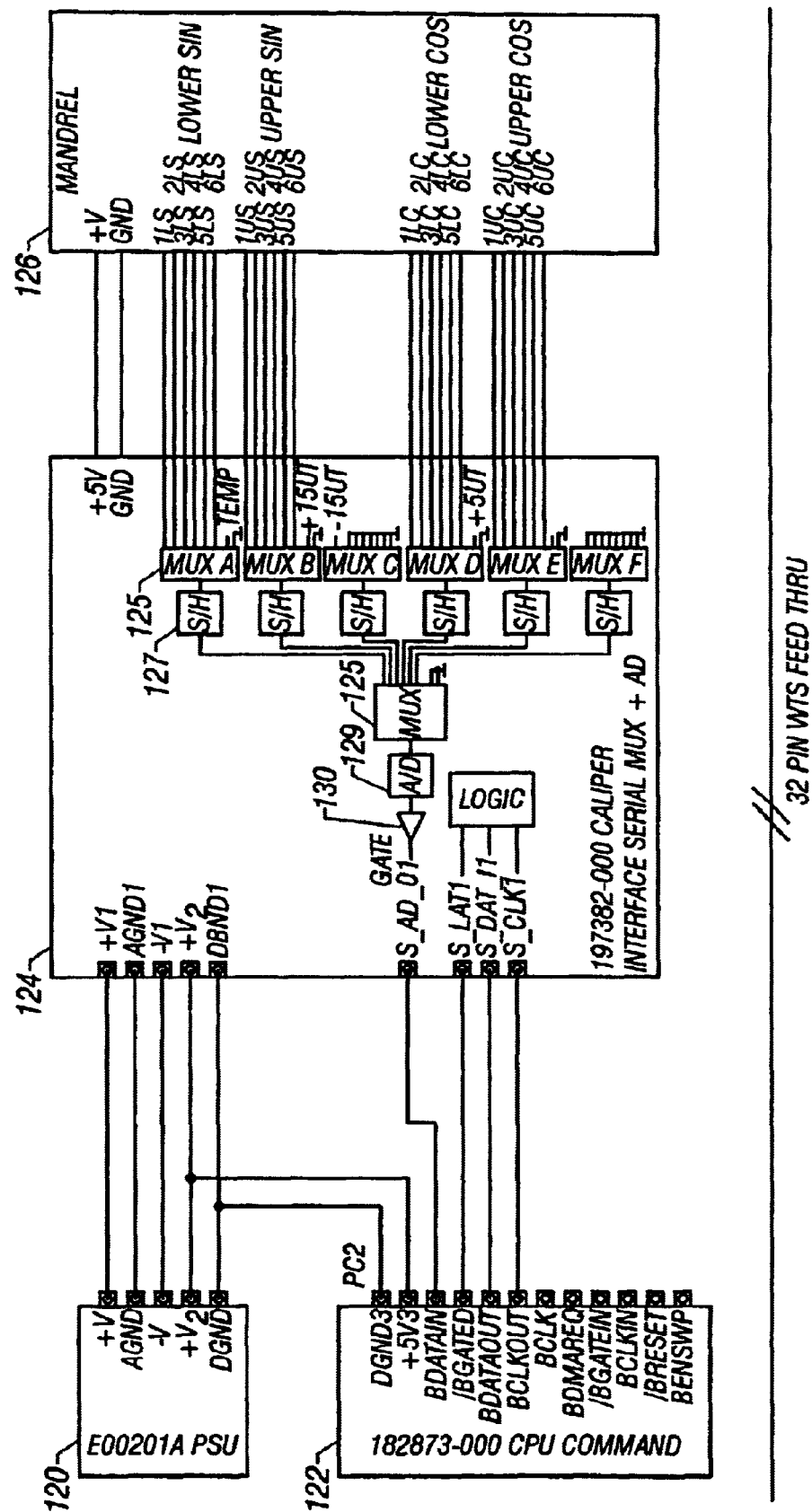
FIG. 10 is a schematic diagram showing a CPU and caliper interface.

A schematic illustration of the CPU board and caliper board is depicted in FIG. 10. The caliper board contains multiplexers 125, S/H circuits 127, shift register, A/D converter 129 and tri-state buffers. The 8-bit shift register is used to control the functions of the board. As two boards are used, one control sequence consists of 16 bits. The two shift registers are connected in series, so that the signal for the second register is shifted through the first. In any case, after the CPU board sent the respective data sequence to these registers, the caliper board behaves as desired.

The 16 bit A/D converter converts the following signals in the following sequence:

Signal Sine of Lower Sensor A of Arm 1;
Signal Sine of Upper Sensor A of Arm 1;
Signal Sine of Lower Sensor B of Arm 1;
Signal Sine of Upper Sensor B of Arm 1;
Signal Sine of Lower Sensor C of Arm 1;
Signal Sine of Upper Sensor C of Arm 1;
Signal Cosine of Lower Sensor A of Arm 1;
Signal Cosine of Upper Sensor A of Arm 1;
Signal Cosine of Lower Sensor B of Arm 1;
Signal Cosine of Upper Sensor B of Arm 1;
Signal Cosine of Lower Sensor C of Arm 1;
Signal Cosine of Upper Sensor C of Arm 1; and
The same sequences are repeated for Arms 2 to 6.

Signals are first selected, then the S/H circuits 127 are switched to hold and all signals for one arm pair (lower and upper) are sequentially converted. The S/H outputs feed a multiplexer 125. The output of the multiplexer is connected to the A/D converter 129 via an operational amplifier 130. The A/D outputs are clocked into the signal input line of the CPU board.

The advantage of not using any exposed wiring is provided by using magnetic sensors. Two sensor sections are used per segment, one to sense the movement of the upper sliding section, the other to sense the movement of the lower sliding section (plus arm angle change as explained above). Due to the small rates of movement near the closed instrument position, very precise measurements are made. The resolution of the preferred system is 5 µm (0.0002"), the accuracy is in the range of 25 µm (0.001").

Three linear magnets ("magnetic ruler") with pole distances of 5 mm (A), 6 mm (B) and 6.25 mm (C) are used. Three magnetic sensor pairs are used to sense the position of each of the three magnets of the ruler. All sensors used for sensing one sliding section position are contained inside one pressure housing. The pressure housing has one central O-ring seat which is used to feed the wires through into the center tube of the instrument.

The 6-Arm Caliper is spring powered. Each arm is connected to a spring 110 which is hooked to the center tube. The arm opening force provided by these springs becomes very small for small diameters. Leaf springs mounted in the center help providing the force for the first few inches.

The CPU board contains a bus interface and a serial I/O port. The gate signal and the clock signal are looped back. The signal-out lines are used to control the caliper boards and the signal-in lines are used to read the information from the caliper sensors. Together with ground, 5 wires are required between CPU board and caliper board. At the end of one complete cycle, 24 sensor signals (12 sine and 12 cosine) are available on the CPU board.

The sensor outputs are temperature-sensitive. For that reason, the ratio of the sine and the cosine signal is calculated (tangent) and used for further calculations. This way, most of the temperature influences cancel out.

The preferred embodiment described above and shown in the figures is not intended to limit the scope of the invention, which is defined by the following claims.

Figure 11:
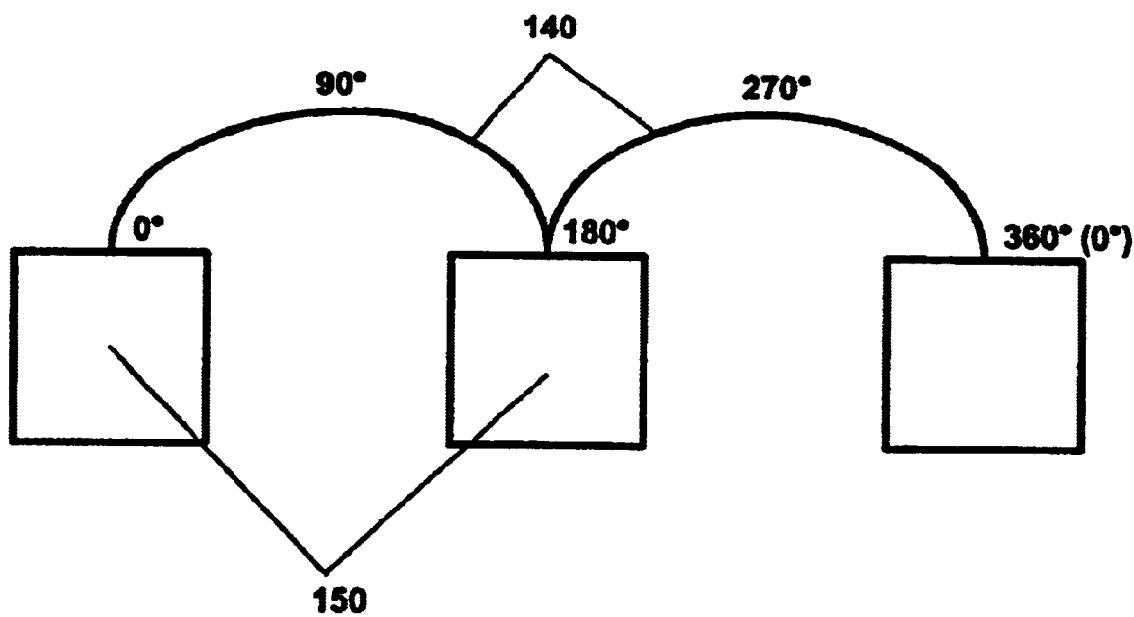
FIG. 11 is an illustration of the field direction across magnetic poles as it changes direction between 0° and 180° between two poles.

In an alternative embodiment shown in FIGS. 7, 8 and 9, magneto-resistive sensors are used for detecting the direction of magnetic fields. The sensors change their resistance depending on the alignment of the magnetic field direction compared to the sensor axis. The transfer function is:

$$R = R_0 + \Delta R \cdot \cos(2 \cdot \Phi)$$

where
R is the measured resistance
$R_0$ field independent resistance
$\Delta R$ field dependent resistance
$\Phi$ magnetic field angle The field direction 140 across magnetic poles 150 changes from 0° to 180° between two poles 150, This is illustrated in FIG. 11. Due to the transfer function as given above, the value of R is the same at the 0° position and the 180° position—cos(2*0) is the same as cos(2* 180).

In a preferred embodiment, two sensor bridges are contained on a chip, the two bridges are designed to be sensitive to two different field directions. The first sensor bridge has its maximum sensitivity at 0° fields, the second sensor bridge has maximum sensitivity at fields which are 90° off the first field. In an alternative embodiment, to achieve this 90° relative response, the second sensor bridge is actually rotated by 45° compared to the first. The outputs of the two half-bridges are fed into amplifiers; at the amplifier outputs the two signals are available.

As for linear magnets, the direction of the magnetic field of a circular magnet where the poles are side by side, with alternating polarity, changes from 0° to 180° degrees between two poles. The magnetic field is perpendicular to the surface of the magnet at the poles and parallel to the surface of the magnet in the middle between two poles.

Magneto-resistive sensors are only sensitive to the alignment with the magnetic field, not to its absolute direction. Hence, the resistance of the first sensor (half bridge) reaches its minimum directly over one of the poles; the maximum of the sensor resistance is reached when the magnetic field is perpendicular to the sensor axis-in the middle between the two poles (cosine). The second sensor (half bridge) is mechanically rotated by 45°; its output is shifted by 90° compared to the first one (sine).

The above examples are intended to be exemplary only and not intended to limit the scope of the invention.

What is claimed is:

1. A caliper instrument for calculating the radii and diameter of a bore hole comprising:

an instrument body having at least one arm pivotably attached to the body for contacting the surface of the bore hole wall;

a magnetic ruler linked to the arm;

a processor associated with the instrument body for calculating the radius of the borehole from the position of the arm; and first and second magneto resistive sensors associated with the instrument body for sensing the position of the magnetic ruler for determining the position of the arm, said first and second sensors located relative to each other to produce a first and second signal, respectively, wherein said first signal is shifted in phase 90° from said second signal for calculating the tangent of the sensed signals.

2. The caliper instrument of claim 1 wherein the magnetic ruler comprises a rectilinear element linked to the arm for determining the position of the arm.

3. The caliper instrument of claim 1 wherein the magnetic ruler comprises a curved element linked to the arm for determining the position of the arm.

4. The caliper instrument of claim 1 wherein the calculated radii are plotted as independent radii.

5. The caliper instrument of claim 1 wherein the calculated radii are plotted as independent diameters.

6. The caliper instrument of claim 1 wherein the calculated radii are plotted as an average bore hole diameter.

7. The caliper claim 1 wherein the first and second magneto resistive sensors are separated linearly by a distance equal to 1.2 of an interpole distance to generate the first and second signals separated by 90°.

8. A The caliper claim 1 wherein the first and second magneto resistive sensors are rotated by 45° to generate the first and second signals phase separated by 90°.

9. A method for calculating the diameter of a bore hole comprising:

contacting the surface of the bore hole wall with an instrument body having at least one arm attached to the body;

sensing magneto resistive sensor signals to determine the position of a magnetic ruler associated with the arm for determining the position of the arm;

calculating a diameter of the borehole, from the signal; calculating the diameter of the bore hole from the position of the arm; and wherein the step of sensing the signals comprises sensing a signal from a first and a second magnetic pole sensor located 90° apart for calculating the tangent of the sensed signals.

10. The method of claim 9 wherein the step of sensing a magneto resistive sensor signal comprises sensing the position of a rectilinear element associated with the magneto resisitive sensor, the rectilinear element being linked to the arm for determining the position of the arm.

11. The method of claim 9 wherein the step of sensing a magneto resistive sensor signal comprises sensing the position of a curved element associated with the magneto resistive sensor, the curved element being linked to the arm for determining the position of the arm.

12. The method of claim 9 further comprising plotting the calculated radii as independent radii.

13. The method of claim 9 further comprising plotting the calculated radii as independent diameters.

14. The method of claim 9 wherein the calculated radii are plotted as an average bore hole diameter.

15. The method of claim 9, wherein the step of sensing the signals comprises sensing signals from the first and second magnetic pole sensors separated linearly by a distance equal to one half of an interpole distance.

16. The method of claim 9, wherein the step of sensing signals comprises sensing signals from the first and second magnetic pole sensors rotated by 45° relative to each other.

* * * * *

UNITED STATES PATENT AND TRADEMARK OFFICE
CERTIFICATE OF CORRECTION

PATENT NO.   : 6,647,637 B2
DATED        : November 18, 2003
INVENTOR(S)  : Helmut Lechen It is certified that error appears in the above-identified patent and that said Letters Patent is hereby corrected as shown below:

Column 3,
Line 16, please insert -- the -- before "form"
Lines 39 and 47, please delete "and"
Line 41, please delete "." and insert therefor -- ; --
Line 50, please delete "." and insert therefor -- ; and --

Column 10,
Line 31, please delete "into"
Lines 62 and 63, please insert -- ; -- after "resistance"
Line 64, please insert -- ; and -- after "resistance"
Line 65, please insert -- . -- after "angle"

Column 11,
Line 7, please delete "," and insert therefor -- ; --

Column 12,
Line 7, please insert -- instrument -- after "caliper"
Line 9, please delete "1.2" and insert therefor -- 1/2 --
Line 23, please delete "calculating a diameter of the borehole, from the signal;"
Lines 41 and 43, please delete "the" after plotting Signed and Sealed this Twenty-ninth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,647,637 B2  
APPLICATION NO. : 10/057650  
DATED : November 18, 2003  
INVENTOR(S) : Helmut Lechen Page 1 of 1

It is certified that error appears in the above-identified patent and that said Letters Patent is hereby corrected as shown below:

At column 3, line 16, please insert --the-- before "form"  
At column 3, line 39, please delete "and"  
At column 3, line 41, please delete "." and insert therefor --;--  
At column 3, line 47, please delete "and"  
At column 3, line 50, please delete "." and insert therefor --; and--  
At column 10, line 31, please delete "into"  
At column 10, line 62, please insert --;-- after "resistance"  
At column 10, line 63, please insert --;-- after "resistance"  
At column 10, line 64, please insert --; and-- after "resistance"  
At column 10, line 65, please insert --.-- after "angle"  
At column 11, line 7, please delete "," and insert therefor --;--  
At claim 7, line 7, please insert --instrument-- after "caliper"  
At claim 7, line 9, please delete "1.2" and insert therefor --1/2--  
At claim 9, line 23, please delete "calculating a diameter of the borehole, from the signal;"  
At claim 12, line 41, please delete "the" after "plotting"  
At claim 13, line 43, please delete "the" after "plotting"

Signed and Sealed this

Twenty-sixth Day of June, 2007

JON W. DUDAS  
*Director of the United States Patent and Trademark Office*